United States Patent
Kim et al.

(10) Patent No.: US 10,818,885 B2
(45) Date of Patent: Oct. 27, 2020

(54) LITHIUM SECONDARY BATTERY

(71) Applicant: SK Innovation Co., Ltd., Seoul (KR)

(72) Inventors: Min-Seong Kim, Daejeon (KR); Eun-Young Kang, Seoul (KR); Ju-Young Choi, Daejeon (KR)

(73) Assignee: SK Innovation Co., Ltd., Seoul (KR)

( * ) Notice: Subject to any disclaimer, the term of this patent is extended or adjusted under 35 U.S.C. 154(b) by 52 days.

(21) Appl. No.: 15/230,759

(22) Filed: Aug. 8, 2016

(65) Prior Publication Data

US 2017/0040577 A1    Feb. 9, 2017

(30) Foreign Application Priority Data

Aug. 7, 2015  (KR) .................. 10-2015-0111546

(51) Int. Cl.
*H01M 2/02* (2006.01)
*H01M 2/10* (2006.01)
*H01M 10/052* (2010.01)

(52) U.S. Cl.
CPC ....... *H01M 2/0287* (2013.01); *H01M 2/0267* (2013.01); *H01M 2/1016* (2013.01); *H01M 2/026* (2013.01); *H01M 2/0262* (2013.01); *H01M 10/052* (2013.01)

(58) Field of Classification Search
CPC ......... H01M 2220/20; H01M 2220/30; H01M 2/026; H01M 2/0262; H01M 2/0287
See application file for complete search history.

(56) References Cited

U.S. PATENT DOCUMENTS

| | | | |
|---|---|---|---|
| 5,445,856 A * | 8/1995 | Chaloner-Gill | B32B 27/18 428/35.9 |
| 2011/0104506 A1* | 5/2011 | Behl | C09J 183/04 428/447 |
| 2011/0117364 A1* | 5/2011 | Uesugi | C09J 7/22 428/354 |
| 2011/0192564 A1* | 8/2011 | Mommer | H01M 2/1094 165/10 |
| 2011/0319534 A1* | 12/2011 | Ding | C08L 67/02 524/100 |
| 2012/0282513 A1 | 11/2012 | Schaefer et al. | |
| 2013/0230773 A1 | 9/2013 | Tsujikawa et al. | |
| 2014/0037924 A1* | 2/2014 | Furuta | C09J 7/22 428/214 |

(Continued)

FOREIGN PATENT DOCUMENTS

| CN | 103459532 A | 12/2013 |
|---|---|---|
| KR | 1020090112258 A | 10/2009 |
| KR | 1020110071638 A | 6/2011 |

(Continued)

*Primary Examiner* — Victoria H Lynch
(74) *Attorney, Agent, or Firm* — The Webb Law Firm (57) ABSTRACT

The present invention provides a lithium secondary battery. In particular, the present invention provides an adhesive pad for a lithium secondary battery in which the adhesive pad including the substrate layer and the adhesive layer formed on at least one surface of the substrate layer is adhered to at least one surface of the exterior material through the adhesive layer, such that it is possible to reduce the danger of ignition or explosion by improving penetration safety when applying to the lithium secondary battery, and a lithium secondary battery including the same.

13 Claims, 4 Drawing Sheets

(56) References Cited

U.S. PATENT DOCUMENTS

2015/0298422 A1* 10/2015 Lodde ..................... B32B 5/00
                                                      428/193
2017/0239923 A1*  8/2017 Fuse ...................... B32B 27/06

FOREIGN PATENT DOCUMENTS

KR    1020120102631 A    9/2012
KR    1020140027045 A    3/2014

* cited by examiner

LITHIUM SECONDARY BATTERY

CROSS-REFERENCE TO RELATED APPLICATION

This application claims priority to Korean Patent Application No. 10-2015-0111546 filed Aug. 7, 2015, the disclosure of which is hereby incorporated in its entirety by reference.

BACKGROUND OF THE INVENTION

1. Field of the Invention

The present invention relates to a lithium secondary battery, and more specifically, to a lithium secondary battery having improved penetration safety.

2. Description of the Related Art

Recently, compact and lightweight electric/electronic devices such as mobile phones, notebook computers, camcorders, and the like have been actively developed and produced. Such the electric/electronic devices have a battery pack embedded therein so that they may operate at places where a separate power source is not provided.

In addition, vehicles using a motor such as hybrid vehicles (HV), electric vehicles (EV), and the like have been developed and produced. Such the vehicles also have a battery pack embedded therein able to operate the motor. The above-described battery pack includes at least one battery so that it can output a voltage at a predetermined level in order to drive the electric/electronic devices or vehicles for a prescribed period of time.

In consideration of economic aspects, recently, a rechargeable secondary battery is employed in the battery pack. As a representative example of the secondary battery, there is a lithium secondary battery such as a nickel-cadmium (Ni—Cd) battery, nickel-hydrogen (Ni-MH) battery, lithium (Li) battery, lithium ion (Li-ion) battery, and the like.

Among these, the lithium secondary battery has been researched and developed from the early 1970s onwards, and has been put to practical use in 1990 due to a development of a lithium ion battery using carbon as an anode instead of lithium metal. The lithium secondary battery has characteristics such as a long cycle lifespan of 500 times or more, and a short charging time of 1 to 2 hours, and thereby an increase in sales thereof is greatest among the secondary batteries. Further, the lithium secondary battery is lighter by about 30 to 40% than the nickel-hydrogen battery, and further lightweighting thereof may be achieved.

Furthermore, the lithium secondary battery has a highest unit battery voltage (3.0 to 3.7 V) among the existing secondary batteries and high energy density without a memory effect, as well as, when not in use, the chance of internal current leakage is low, and is very lightweight. Therefore, the lithium secondary battery is widely used in various portable electronic devices such as notebook computers, cameras, mobile phones, and the like. In addition, due to characteristics of high energy density, frequency in use thereof tends to be gradually increased in fields such as defense industries, automated systems, vehicles, and aerospace industries.

Meanwhile, as the use of the battery is increased, the need for safety thereof is also increased. For example, when the battery pack is penetrated due to an impact applied from an outside or a deformation in an appearance thereof, there may be problems. In particular, in such a case of the electric vehicle, when occurring a situation such as an accident, the possibility of penetrating the battery pack is increased.

When the battery pack is penetrated as described above, an anode and a cathode in a charged state physically come into contact with each other. Thereby, if a high current flows therein in a short time, phenomena such as abnormal heating and thermal runaway of the battery pack may occur. That is, since an organic electrolyte acts as a fuel in a combustion reaction of the battery, the combustion reaction is spontaneously progressed, and since a combustion heat is accumulated inside cells, a temperature of the battery is continuously raised to induce a series of pyrolytic reactions. Thereby, an ignition or explosion may occur in the portable electronic device.

In particular, in transport devices such as electrical vehicles, penetration safety is an issue that is directly related to the life of passengers using the transport devices. Therefore, when the penetration safety is not secured, an application of the lithium secondary battery to the transport devices should be limited, and the safety of the battery is becoming a more important issue in fields such as for vehicles, which require a high capacity power supply.

As requirements for safety of the secondary battery are increased, the penetration safety is recognized as an important evaluation item among various safety evaluation items for the secondary battery, and various attempts for improving the penetration safety have been performed.

Korean Patent Laid-Open Publication No. 2012-0102631 discloses a cathode including an active material having two types of active materials mixed therein, however, has not proposed an alternative solution in regard to the foregoing problems.

SUMMARY OF THE INVENTION

Accordingly, it is an object of the present invention to provide a lithium secondary battery having reduced danger of ignition or explosion by improving penetration safety.

In order to accomplish the above object, there is provided a lithium secondary battery including: an adhesive pad which includes a substrate layer and an adhesive layer formed on at least one surface of the substrate layer; and an exterior material in which the adhesive pad is adhered to at least one surface thereof through the adhesive layer.

In the lithium secondary battery according to an embodiment of the present invention, the substrate layer may be formed by a plurality of layers including a heat-resistance material layer and a flame-retardant material layer, and the substrate layer may be a single layer including a heat-resistance material and a flame-retardant material.

In the lithium secondary battery according to an embodiment of the present invention, the substrate layer may have a thickness of 5 to 500 μm.

In the lithium secondary battery according to an embodiment of the present invention, the adhesive layer may surround the substrate layer.

In the lithium secondary battery according to an embodiment of the present invention, the adhesive layer may have a thickness of 10 to 1000 μm, and the adhesive layer may have adhesiveness of 5 to 100 N/cm with respect to the substrate layer.

In the lithium secondary battery according to an embodiment of the present invention, the adhesive pad may have an elongation of 50 to 500%.

In the lithium secondary battery according to an embodiment of the present invention, the adhesive pad may include a plurality of substrate layers and a plurality of adhesive layers, and in particular, the adhesive pad may be formed in a structure in which a plurality of substrate layers and a plurality of adhesive layers are alternately stacked one by one on each other.

In the lithium secondary battery according to an embodiment of the present invention, the heat-resistance material may include at least one of a thermosetting resin or a thermoplastic resin having a melting point of 200° C. or higher.

In the lithium secondary battery according to an embodiment of the present invention, the flame-retardant material may include at least one selected from a group consisting of an inorganic compound flame retardant, halogen-based flame retardant and phosphorus-based flame retardant.

In the lithium secondary battery according to an embodiment of the present invention, the thermosetting resin may include at least one selected from a group consisting of a phenol resin, urea resin, melamine resin, alkyd resin, polyester resin, silicone resin, epoxy resin, polyurethane resin and furan resin.

In the lithium secondary battery according to an embodiment of the present invention, the thermoplastic resin may include at least one selected from a group consisting of an acrylic resin, vinyl chloride resin, vinyl acetate resin, vinyl acetyl resin, methyl methacrylate resin, polystyrene resin, polyethylene resin, polyamide resin and celluloid resin.

In the lithium secondary battery according to an embodiment of the present invention, the thermoplastic resin may include at least one selected from a group consisting of polytetrafluoroethylene, polyxylene, polystyrene, polyacrylonitrile, poly-6-aminocaproic acid, polyhexamethylene sebacamide.

In the lithium secondary battery according to an embodiment of the present invention, the adhesive layer may include at least one of an acrylic adhesive and a silicone adhesive.

In the lithium secondary battery according to an embodiment of the present invention, the acrylic adhesive may include at least one selected from a group consisting of ethyl acrylate, butyl acrylate, 2-ethylhexyl acrylate and isononyl acrylate.

In the lithium secondary battery according to an embodiment of the present invention, the silicone adhesive may include at least one selected from a group consisting of polydimethylsiloxane and polydimethyl diphenylsiloxane.

According to the lithium secondary battery of the present invention, the adhesive pad including the substrate layer and the adhesive layer formed on at least one surface of the substrate layer is adhered to at least one surface of the exterior material through the adhesive layer to form an adhesive surface with an object which causes the penetration (hereinafter, referred to as 'a penetration causing object') when penetrating the lithium secondary battery, such that it is possible to achieve the lithium secondary battery having reduced danger of ignition or explosion by blocking external oxygen inflowing into the battery.

In addition, according to the lithium secondary battery of the present invention, since the adhesive pad is adhered to at least one surface of the exterior material through the adhesive layer to form the adhesive surface with the penetration causing object when penetrating the lithium secondary battery, it is possible to prevent a gas such as carbon monoxide or carbon dioxide generated by a side reaction of electrodes and electrolyte according to an increase in a temperature from flowing out to the outside of the secondary battery, and thereby further reducing the danger of ignition or explosion by suppressing the oxygen supplied from the outside.

Further, according to the lithium secondary battery of the present invention, since the adhesive pad may be simply adhered to the outside of the exterior material, it is possible to achieve the lithium secondary battery having improved penetration safety without changing an existing process of manufacturing the lithium secondary battery, thus having excellent economic advantages.

BRIEF DESCRIPTION OF THE DRAWINGS

The above and other objects, features and other advantages of the present invention will be more clearly understood from the following detailed description taken in conjunction with the accompanying drawings, in which.

DESCRIPTION OF THE INVENTION

The present invention discloses a lithium secondary battery in which the adhesive pad including the substrate layer and the adhesive layer formed on at least one surface of the substrate layer is adhered to at least one surface of the exterior material through the adhesive layer, such that it is possible to achieve the lithium secondary battery having reduced danger of ignition or explosion by improving penetration safety.

Hereinafter, preferred embodiments of the present invention will be described in detail with reference to the accompanying drawings. However, since the drawings attached to the present disclosure are only given for illustrating one of preferable various embodiments of present invention to easily understand the technical spirit of the present invention with the above-described invention, it should not be construed as limited to such a description illustrated in the drawings.

When the battery pack is penetrated by an external force, if a high current flows therein in a short time due to an occurrence of an internal short circuit, phenomena such as abnormal heating and thermal runaway of the battery pack may occur. Thereby, such phenomena may cause an ignition or explosion of a device using the secondary battery, and thus the need for penetration safety of the lithium secondary battery is increased.

Generally, in order to prevent a deterioration in the secondary battery due to a reaction with moisture in an external air, an inside of a battery exterior material which houses an electrolyte and an electrode assembly is maintained in a vacuum state. However, when such the secondary battery is penetrated, in order to reach equilibrium with an atmospheric pressure, the external air flows into an inside of the battery which was maintained in the vacuum state, and oxygen required for the combustion is supplied thereto from the inflowing air to cause an ignition and rapid combustion reaction or explosion of the battery.

Therefore, in the lithium secondary battery of the present invention, the adhesive pad including the substrate layer and the adhesive layer formed on at least one surface of the substrate layer is adhered to at least one surface of the exterior material through the adhesive layer, such that the above-described problems are solved.

Figure 1:
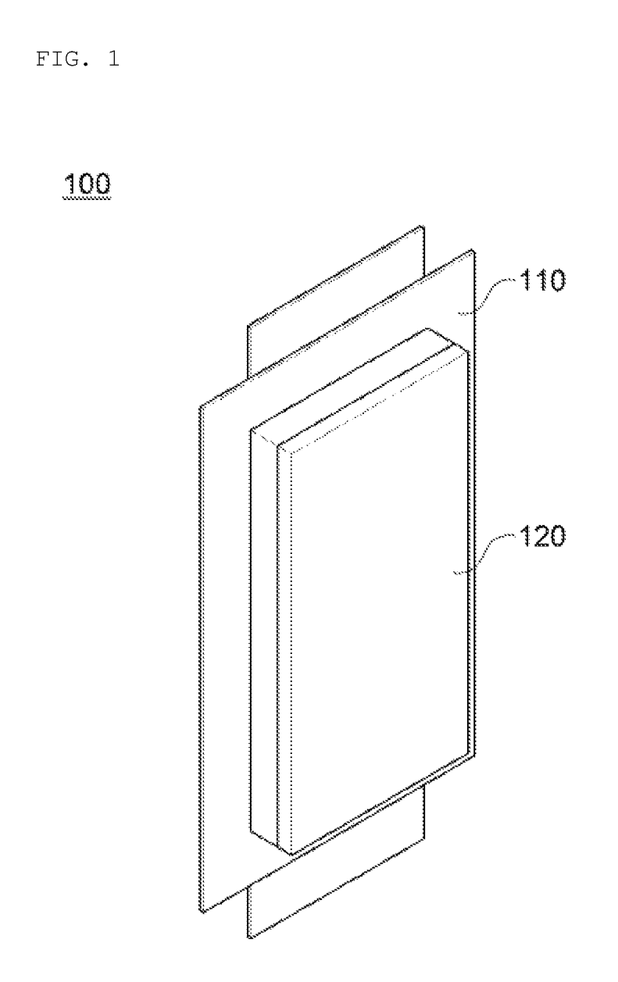
FIG. 1 is a perspective view schematically illustrating a lithium secondary battery according to an embodiment of the present invention.
Figure 6:
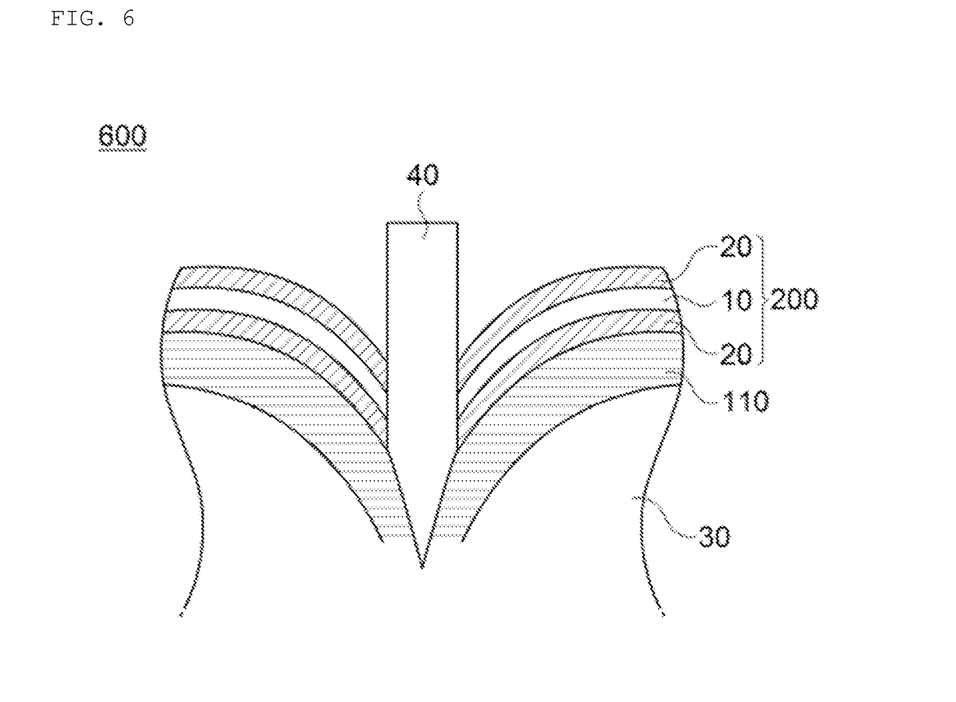
FIG. 6 is a cross-sectional view schematically illustrating that an inflow of oxygen is blocked when penetrating in the lithium secondary battery according to the embodiment of the present invention.

More particularly, as illustrated in FIG. 1, in a lithium secondary battery 100 of the present invention, an adhesive pad 120 is adhered to at least one surface of an exterior material 110 to form an adhesive surface with a penetration causing object 40 when penetrating the secondary battery as illustrated in FIG. 6, such that it is possible to prevent the ignition or explosion of the secondary battery by blocking oxygen inflowing into an inside 30 of the battery.

Figure 2:
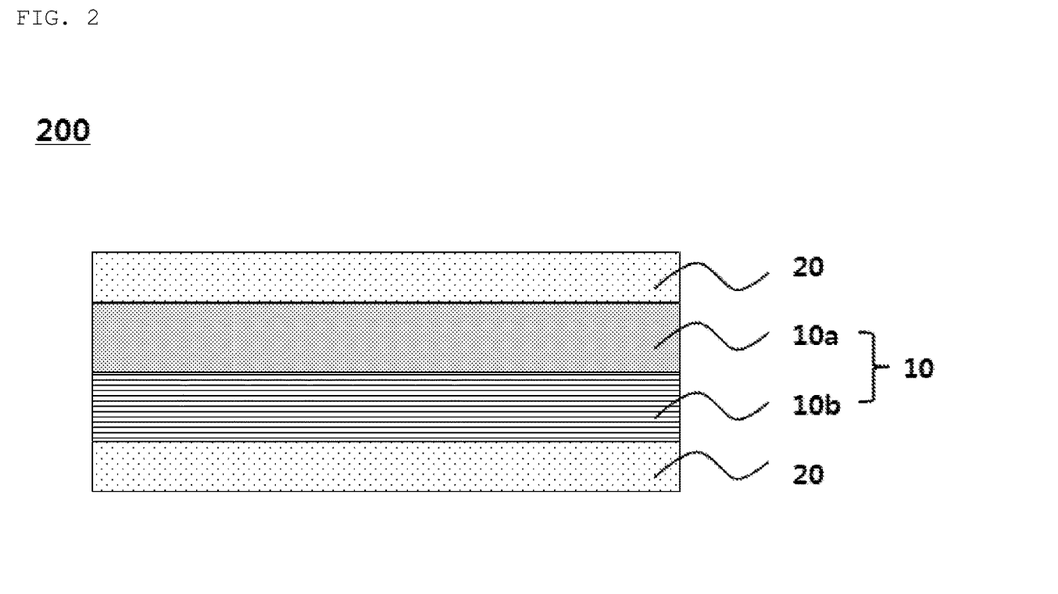
FIGS. 2 to 5 are cross-sectional views schematically illustrating adhesive pads according to embodiments of the present invention, respectively.

In addition, as illustrated in FIG. 2, an adhesive pad 200 according to the present invention includes a substrate layer 10 having excellent heat-resistance and flame-retardance and an adhesive layer 20 formed on at least one surface of the substrate layer 10, and is adhered to at least one surface of the exterior material through the adhesive layer, such that the adhesive layer 20 forms the adhesive surface with the penetration causing object 40 when penetrating the secondary battery, as illustrated in FIG. 6. Thus, it is possible to prevent a gas such as carbon monoxide or carbon dioxide generated by a side reaction of electrodes and electrolyte according to an increase in a temperature when penetrating the lithium secondary battery from flowing out to the outside of the secondary battery, and thereby further reducing the danger of ignition or explosion by suppressing the oxygen supplied from the outside.

Further, since the adhesive pad according to the present invention may be detachably adhered to the exterior material in a simple manner, it is possible to achieve the lithium secondary battery having improved penetration safety without changing the existing process of manufacturing the lithium secondary battery, thus having excellent economic advantages.

Adhesive Pad

As illustrated in FIG. 2, the adhesive pad 200 according to one embodiment of the present invention includes the substrate layer 10 and the adhesive layer 20 formed on at least one surface of the substrate layer 10.

An elongation of the adhesive pad 200 according to the embodiment of the present invention is not particularly limited, but for example, the adhesive pad 200 may have an elongation of 50 to 500% measured at room temperature, and preferably, 50 to 200%. Within the above range, excellent effects of blocking the oxygen inflowing into the battery may be obtained, thereby being preferable in view thereof.

Figure 5:
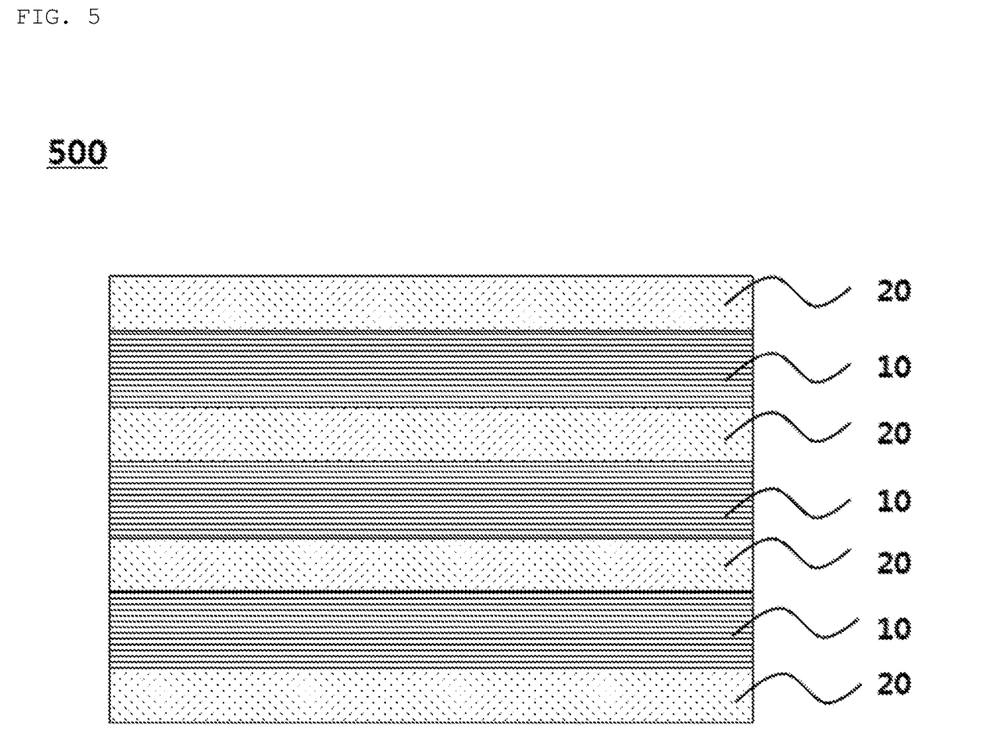

According to another embodiment of the present invention, the adhesive pad 200 including the substrate layer 10 and the adhesive layer 20 according to the present invention may include a plurality of substrate layers 10 and a plurality of adhesive layers 20, as illustrated in FIG. 5. More particularly, for example, the adhesive pad may be formed in a structure in which a plurality of substrate layers and a plurality of adhesive layers are alternately stacked one by one on each other, thus to maximize the effect of blocking the inflowing oxygen when penetrating the secondary battery.

Substrate Layer 10

The substrate layer 10 according to the embodiment of the present invention has excellent heat-resistance and flame-retardance, thereby plays a role of preventing a rapid change in a temperature, ignition and explosion of the secondary battery also when penetrating the secondary battery, and also plays a role of a substrate on which the adhesive layer 20 is stacked.

Figure 3:
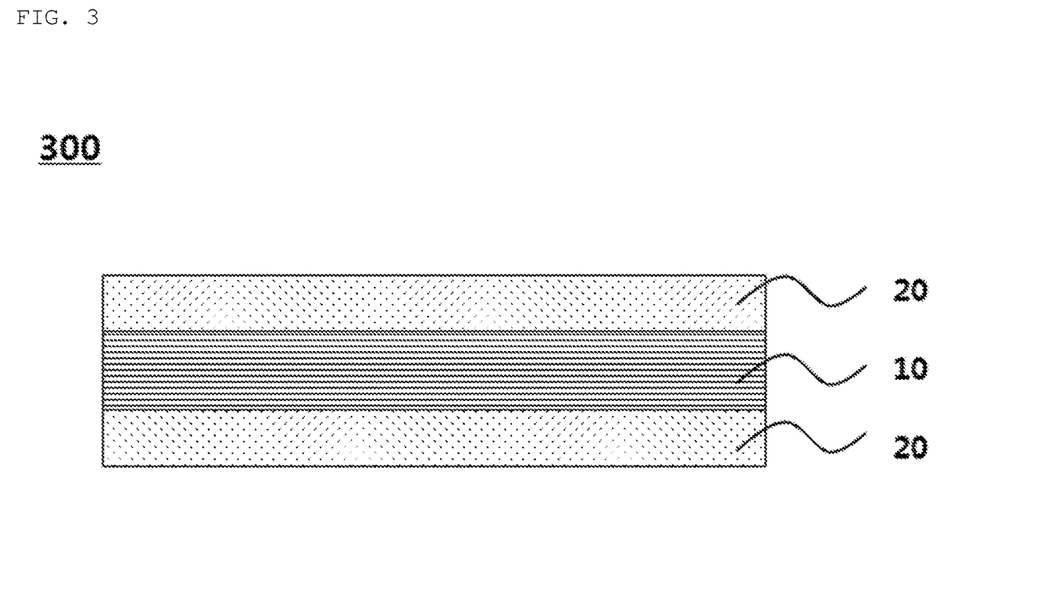

The substrate layer 10 according to the embodiment of the present invention may be a single layer including a heat-resistance material and a flame-retardant material, as illustrated in FIG. 3.

The heat-resistance material included in the substrate layer 10 of the present invention may use any material without particular limitation thereof so long as it has excellent heat-resistance, and as a particular example, may include a thermosetting resin or a thermoplastic resin having a melting point of 200° C. or higher. These resins may be used alone or in combination of two or more thereof.

A particular example of the thermosetting resin may include, for example, a phenol resin, urea resin, melamine resin, alkyd resin, polyester resin, silicone resin, epoxy resin, polyurethane resin, furan resin, or the like. These resins may be used alone or in combination of two or more thereof.

The thermoplastic resin having a melting point of 200° C. or higher may include, for example, an acrylic resin, vinyl chloride resin, vinyl acetate resin, vinyl acetyl resin, methyl methacrylate resin, polystyrene resin, polyethylene resin, polyamide resin, celluloid resin, or the like. These resins may be used alone or in combination of two or more thereof.

A particular example of the thermoplastic resin having a melting point of 200° C. or higher may include polytetrafluoroethylene, polyxylene, polystyrene, polyacrylonitrile, poly-6-aminocaproic acid, polyhexamethylene sebacamide. These compounds may be used alone or in combination of two or more thereof.

The flame-retardant material included in the substrate layer 10 of the present invention may use any material without particular limitation thereof so long as it has excellent flame-retardance, and as a particular example, may include an inorganic compound flame retardant, halogen-based flame retardant, phosphorus-based flame retardant, or the like. These flame retardants may be used alone or in combination of two or more thereof.

A particular example of the inorganic compound flame retardant may include aluminum hydroxide, magnesium hydroxide, antimony oxide, tin hydroxide, tin oxide, molybdenum oxide, a zirconium compound, calcium salt, a boron-containing compound, or the like. These compounds may be used alone or in combination of two or more thereof.

A particular example of the halogen-based flame retardant may include tribromophenoxyethane, tetrabromobisphenol-A (TBBA), octabromodiphenyl ether (OBDPE), brominated flame retardant including brominated epoxy, and a brominated polycarbonate oligomer, chlorinated flame retardant including chlorinated paraffin, chlorinated polyethylene, alicyclic epoxy, or the like. These compounds may be used alone or in combination of two or more thereof.

A particular example of the phosphorus-based flame retardant may include phosphine oxide, phosphine oxide diols, phosphites, phosphonates, triaryl phosphate, alkyldiaryl phosphate, trialkyl phosphate, resorcinaol bisdiphenyl phosphate (RDP), or the like. These compounds may be used alone or in combination of two or more thereof.

The substrate layer of a single layer including the heat-resistance material and the flame-retardant material according to the embodiment of the present invention may be formed by dispersing the flame-retardant material therein using the above-described thermosetting resin or thermoplastic resin as a binder.

Further, the substrate layer 10 according to the embodiment of the present invention may be formed by a plurality of layers including a heat-resistance material layer 10a and a flame-retardant material layer 10b, as illustrated in FIG. 2.

The heat-resistance material layer 10a may be a layer made of the above-described thermosetting resin or thermoplastic resin, and the flame-retardant material layer 10b may be a layer made of the flame-retardant material which is dispersed therein using a polymer resin as a binder. The polymer resin included in the flame-retardant material layer 10b may use the thermosetting resin or thermoplastic resin included in the heat-resistance material layer 10a.

An entire thickness of the substrate layer 10 according to the embodiment of the present invention is not particularly limited, but it may have, for example, a thickness of 5 to 500 μm, and preferably 10 to 150 μm. If the thickness of the substrate layer 10 is less than 5 μm, when applying a composition for forming a heat-resistance material layer or flame-retardant material layer to the substrate layer, the substrate layer may be broken, and the thickness of the heat-resistance material layer or flame-retardant material layer may be uneven. If the thickness thereof exceeds 500 μm, an energy density per volume of the secondary battery may be decreased.

Adhesive Layer 20

The adhesive layer 20 according to the embodiment of the present invention is formed on at least one surface of the substrate layer 10, such that it is possible to improve the penetration safety of the lithium secondary battery by playing a role of blocking the inflowing external oxygen also when penetrating the lithium secondary battery.

More particularly, the adhesive pad 200 according to the embodiment of the present invention may include the adhesive layer 20 formed on at least one surface of the substrate layer 10, as illustrated in FIG. 2. The adhesive pad 200 including the adhesive layer 20 according to the present invention is adhered to at least one surface of the exterior material through the adhesive layer. Therefore, as illustrated in FIG. 6, the adhesive layer 20 forms the adhesive surface with the penetration causing object 40 when penetrating the secondary battery to surround peripheral parts thereof, and thereby it is possible to prevent the ignition or explosion of the secondary battery by blocking oxygen inflowing into the inside 30 of the battery.

In addition, in the lithium secondary battery according to the embodiment of the present invention, as illustrated in FIG. 6, since the adhesive pad 200 is adhered to at least one surface of the exterior material 110 through the adhesive layer 20 to form the adhesive surface with the penetration causing object 40 when penetrating the secondary battery, it is possible to prevent a gas such as carbon monoxide or carbon dioxide generated by a side reaction of electrodes and electrolyte according to an increase in a temperature from flowing out to the outside of the secondary battery, and thereby further reducing the danger of ignition or explosion by suppressing the oxygen supplied from the outside.

Further, in the lithium secondary battery according to one embodiment of the present invention, since the adhesive pad may be simply adhered to the exterior material by including the adhesive layer for providing attaching and detaching functions, it is possible to achieve the lithium secondary battery having improved penetration safety without changing the existing process of manufacturing the lithium secondary battery, thus having excellent economic advantages.

Figure 4:
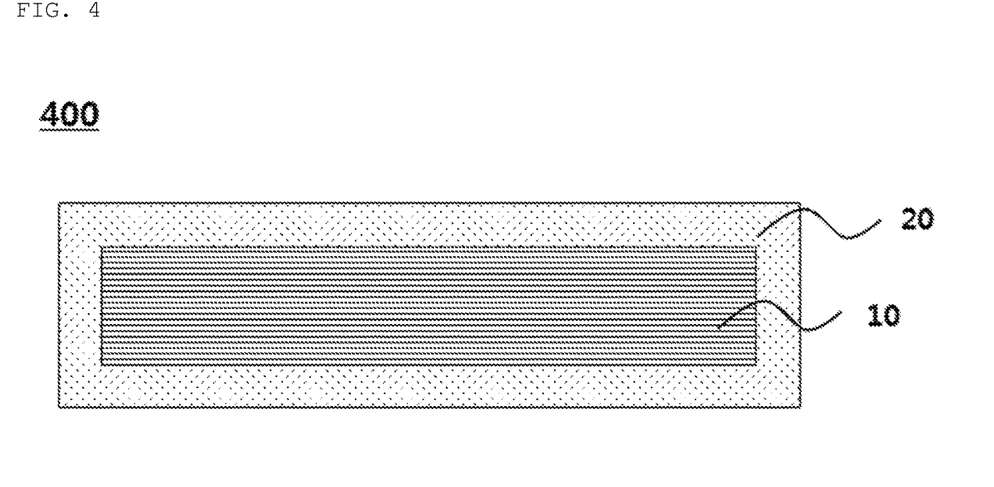

In an adhesive pad 400 according to another embodiment of the present invention, the adhesive layer 20 may be formed so as to surround the substrate layer 10 as illustrated in FIG. 4.

The thickness of the adhesive layer 20 is not particularly limited, but it may have, for example, a thickness of 10 to 1000 μm, and preferably 10 to 50 μm. If the thickness of the adhesive layer 20 is less than 10 μm, the effect of blocking the inflowing oxygen may be insignificant. If the thickness thereof exceeds 1000 μm, the energy density per volume of the secondary battery may be decreased.

Adhesiveness of the adhesive layer 20 according to the embodiment of the present invention with respect to the substrate layer 10 is not particularly limited, but the adhesive layer 20 may have, for example, adhesiveness of 5 to 100 N/cm with respect to the substrate layer 10, which is measured at room temperature. By surrounding the peripheral parts of the penetration causing object 40 within the above range, excellent effects of blocking the oxygen inflowing into the inside 30 of the battery may be obtained, thereby being preferable in view thereof.

The adhesive included in the adhesive layer 20 of the present invention may use any adhesive so long as it is commonly used in the related art without particular limitation thereof, and as a particular example, may include an acrylic adhesive, a silicone adhesive, or the like. These adhesives may be used alone or in combination of two or more thereof.

The acrylic adhesive is a compound made by copolymerizing of acrylic acid and ester, and as a particular example, may include ethyl acrylate and butyl acrylate, 2-ethylhexyl acrylate, isononyl acrylate, or the like. These compounds may be used alone or in combination of two or more thereof.

A particular example of the silicone adhesive may include polydimethylsiloxane with a high molecular weight having a silanol group as a functional group, polydimethyl diphenylsiloxane, or the like. These compounds may be used alone or in combination of two or more thereof.

Lithium Secondary Battery

The lithium secondary battery to which the adhesive pad according to the embodiment of the present invention may be adhered is not particularly limited. For example, the lithium secondary battery may have types of a can, pouch, coin, and the like, but it is not limited thereto.

Hereinafter, preferred embodiments are proposed to more concretely describe the present invention. However, the following examples are only given for illustrating the present invention and those skilled in the related art will obviously understand that various alterations and modifications are possible within the scope and spirit of the present invention. Such alterations and modifications are duly included in the appended claims.

Preparative Example 1

A substrate layer having an entire thickness of 150 μm was formed by forming a heat-resistance material layer including polyacrylonitrile having a melting point of 615 K and a flame-retardant material layer in which aluminum hydroxide is dispersed in the polyacrylonitrile, and an adhesive pad was prepared, which included an adhesive layer formed thereon of acrylic adhesive to have a thickness of 30 μm and adhesiveness of 6.7 N/cm with respect to the substrate layer measured at room temperature. The prepared adhesive pad had an elongation of 120% measured at room temperature.

Preparative Example 2

A substrate layer having a thickness of 150 μm was formed by mixing polytetrafluoroethylene having a melting point of 600 K and phosphine oxide, and an adhesive pad was prepared, which included an adhesive layer formed thereon of silicone adhesive to have a thickness of 30 μm and adhesiveness of 5.3 N/cm with respect to the substrate layer measured at room temperature. The prepared adhesive pad had an elongation of 110% measured at room temperature.

EXAMPLES AND COMPARATIVE EXAMPLE

Example 1

$Li_1Mn_2O_2$ as a cathode active material, Denka Black as a conductive material, and PVDF as a binder were used in a weight ratio of 92:5:3, respectively, to prepare a cathode slurry. Thereafter, the slurry was applied to an aluminum substrate to coat the same, followed by drying to prepare a cathode.

90% by weight ('wt. %') of natural graphite, 5 wt. % of PVDF-based binder, and 5 wt. % of dimethyl sulfoxide (DMSO) were mixed as an anode active material to prepare an anode slurry. Thereafter, the slurry was applied to a copper substrate to coat the same, followed by drying to prepare an anode.

The prepared cathode and anode, a separation film (polyethylene, thickness 25 μm), and a non-aqueous electrolyte (EC/EMC/DEC in a volume ratio of 25/45/30) were used to form a battery, and the battery was housed in a pouch formed in four layers made of polypropylene-aluminum-nylon-polyethylene terephthalate.

The adhesive pad prepared in Preparative Example 1 was stacked in two layers and adhered to an outside of the pouch.

Example 2

A secondary battery was manufactured according to the same procedures as described in Example 1, except that the adhesive pad prepared in Preparative Example 2 was adhered to the outside of the pouch.

Comparative Example 1

A secondary battery was manufactured according to the same procedures as described in Example 1, except that the adhesive pad was not adhered to the outside of the pouch.

Experimental Example

The following evaluation for the lithium secondary batteries of the examples and the comparative example was performed.

(1) Evaluation of Penetration Safety

In order to evaluate the penetration safety for the lithium secondary batteries manufactured in the examples and the comparative example, ten samples of the examples and the comparative example were prepared with being fully charged, and then a nail penetration test was performed according to SBA G 1101 (a stainless steel nail having a diameter of 3π mm) under a condition of 20 A. The penetration safety was evaluated according to the following standards for evaluation, and the evaluated results are shown in Table 1 below.

Further, the maximum temperature of each sample surface was measured after the nail penetration test.

<Standards for Evaluation>

L1: no occurrence of abnormality in a battery performance

L2: irreversible damage occurred in a battery performance

L3: weight of electrolyte in the battery was decreased by less than 50%

L4: weight of electrolyte in the battery was decreased by 50% or more

L5: ignition or explosion occurred in the battery

TABLE 1

| Section | Penetration safety evaluation (Nail penetration test) | Maximum temperature of surface (° C.) |
|---|---|---|
| Example 1 | L4 | 163 |
| Example 2 | L3 | 149 |
| Comparative Example 1 | L5 | 628 |

Referring to Table 1, in the case of the examples including the lithium secondary batteries according to the present invention, it was confirmed that, as a result of the nail penetration test, the batteries had excellent penetration safety, and danger of ignition or explosion was suppressed due to the reduced maximum temperature of the battery surface.

However, in the case of the comparative example without the lithium secondary battery according to the present invention, it was confirmed that the maximum temperature of the battery surface was at least four times higher than the examples, and as a result of the nail penetration test, momentary thermal runaway occurred and then explosion of the battery occurred.

DESCRIPTION OF REFERENCE NUMERALS

100: lithium secondary battery
110: exterior material
120, 200, 300, 400, 500: adhesive pad
10: substrate layer
10a: heat-resistance material layer
10b: flame-retardant material layer
20: adhesive layer
30: inside of lithium secondary battery
40: penetration causing object

What is claimed is:

1. A lithium secondary battery comprising:
an exterior material;
an electrode assembly at an inside of the exterior material; and
an adhesive pad adhered to at least one surface of the exterior material,
wherein the adhesive pad includes:
a substrate layer that is a single layer including a heat-resistance material and a flame-retardant material, wherein the heat-resistance material and the flame-retardant material are within the substrate layer, and the flame-retardant material includes at least one selected from a group consisting of an inorganic compound flame retardant, halogen-based flame retardant and phosphorus-based flame retardant; and
an adhesive layer directly formed on the substrate layer to continuously surround a top surface, a bottom surface, and two side surfaces of the substrate layer, the adhesive layer being configured to suppress an oxygen penetration from an outside of the exterior material to the inside of the exterior material, the adhesive layer including at least one of an acrylic adhesive or a silicone adhesive.

2. The lithium secondary battery according to claim 1, wherein the substrate layer has a thickness of 5 to 500 μm.

3. The lithium secondary battery according to claim 1, wherein the adhesive layer has a thickness of 10 to 1000 μm.

4. The lithium secondary battery according to claim 1, wherein the adhesive layer has adhesiveness of 5 to 100 N/cm with respect to the substrate layer.

5. The lithium secondary battery according to claim 1, wherein the adhesive pad has an elongation of 50 to 500%.

6. The lithium secondary battery according to claim 1, wherein the adhesive pad includes a plurality of substrate layers and a plurality of adhesive layers.

7. The lithium secondary battery according to claim 1, wherein the adhesive pad is formed in a structure in which a plurality of substrate layers and a plurality of adhesive layers are alternately stacked one by one on each other.

8. The lithium secondary battery according to claim 1, wherein the heat-resistance material includes at least one of a thermosetting resin or a thermoplastic resin having a melting point of 200° C. or higher.

9. The lithium secondary battery according to claim 8, wherein the thermosetting resin includes at least one selected from a group consisting of a phenol resin, urea resin, melamine resin, alkyd resin, polyester resin, silicone resin, epoxy resin, polyurethane resin and furan resin.

10. The lithium secondary battery according to claim 8, wherein the thermoplastic resin includes at least one selected from a group consisting of an acrylic resin, vinyl chloride resin, vinyl acetate resin, vinyl acetyl resin, methyl methacrylate resin, polystyrene resin, polyethylene resin, polyamide resin and celluloid resin.

11. The lithium secondary battery according to claim 8, wherein the thermoplastic resin includes at least one selected from a group consisting of polytetrafluoroethylene, polyxylene, polystyrene, polyacrylonitrile, poly-6-aminocaproic acid, and polyhexamethylene sebacamide.

12. The lithium secondary battery according to claim 1, wherein the acrylic adhesive includes at least one selected from a group consisting of ethyl acrylate, butyl acrylate, 2-ethylhexyl acrylate and isononyl acrylate.

13. The lithium secondary battery according to claim 1, wherein the silicone adhesive includes at least one selected from a group consisting of polydimethylsiloxane and polydimethyl diphenylsiloxane.

* * * * *